United States Patent [19]

Kurihara et al.

[11] Patent Number: 6,054,086
[45] Date of Patent: Apr. 25, 2000

[54] PROCESS OF MAKING HIGH-STRENGTH YARNS

[75] Inventors: Kazuhiko Kurihara, Tokyo; Hiroshi Yazawa, Kunitachi, both of Japan

[73] Assignees: Nippon Petrochemicals Co., Ltd.; Polymer Processing Research Inst., Ltd., both of Tokyo, Japan

[21] Appl. No.: 08/617,635

[22] Filed: Mar. 19, 1996

[30] Foreign Application Priority Data

Mar. 24, 1995 [JP] Japan .................................. 7-091653
Mar. 24, 1995 [JP] Japan .................................. 7-091654

[51] Int. Cl.⁷ .......................... B29C 47/06; B29C 55/08; D01D 5/42; D01F 8/06
[52] U.S. Cl. .............. 264/147; 264/173.14; 264/173.15; 264/173.19; 264/210.7; 264/210.8; 264/290.2; 264/290.5
[58] Field of Search ............................... 264/147, 173.14, 264/173.15, 173.19, 210.7, 210.8, 290.2, 290.5

[56] References Cited

U.S. PATENT DOCUMENTS

| | | | |
|---|---|---|---|
| 3,639,573 | 2/1972 | Port | 264/75 |
| 3,853,662 | 12/1974 | Yazawa et al. | 156/265 |
| 3,859,156 | 1/1975 | Yazawa et al. | 156/265 |
| 3,904,334 | 9/1975 | Yazawa et al. | 425/71 |
| 4,052,242 | 10/1977 | Yazawa et al. | 156/265 |
| 4,349,500 | 9/1982 | Yazawa et al. | 264/259 |
| 4,525,317 | 6/1985 | Okada et al. | 264/235.8 |
| 4,814,131 | 3/1989 | Atlas | 264/147 |
| 4,992,124 | 2/1991 | Kurihara et al. | 156/161 |
| 5,032,442 | 7/1991 | Yamazaki et al. . | |
| 5,055,438 | 10/1991 | Canich | 502/117 |
| 5,234,652 | 8/1993 | Woodhams et al. . | |
| 5,246,657 | 9/1993 | Yagi et al. | 264/210.8 X |
| 5,380,810 | 1/1995 | Lai et al. | 526/352 |

FOREIGN PATENT DOCUMENTS

| | | |
|---|---|---|
| 0 113 117 A1 | 7/1984 | European Pat. Off. . |
| 0 213807 | 3/1987 | European Pat. Off. . |
| 0 301 599 A2 | 2/1989 | European Pat. Off. . |
| 0 374785 | 6/1990 | European Pat. Off. . |
| 0 379 763 A1 | 8/1990 | European Pat. Off. . |
| 0 402 484 A1 | 12/1990 | European Pat. Off. . |
| 483 780 A2 | 5/1992 | European Pat. Off. . |
| 2 633 215 | 12/1989 | France . |
| 1807954 | 6/1969 | Germany . |
| 2042746 | 3/1972 | Germany . |
| 27 21 320 A1 | 11/1978 | Germany . |
| 37-9765 | 7/1937 | Japan . |
| 44-22231 | 9/1969 | Japan . |
| 46-43275 | 12/1971 | Japan . |
| 47-47084 | 11/1972 | Japan . |
| 48-22966 | 7/1973 | Japan . |
| 49-48580 | 12/1974 | Japan . |
| 50-40185 | 12/1975 | Japan . |
| 50-40186 | 12/1975 | Japan . |
| 51-30182 | 8/1976 | Japan . |
| 53-38783 | 10/1978 | Japan . |
| 55-51058 | 12/1980 | Japan . |
| 57-30368 | 6/1982 | Japan . |
| 57-54581 | 11/1982 | Japan . |
| 59-32307 | 8/1984 | Japan . |
| 60-37786 | 8/1985 | Japan . |
| 61-11757 | 6/1986 | Japan . |
| 61-23104 | 6/1986 | Japan . |
| 62-104911 | 5/1987 | Japan . |
| 62-122736 | 6/1987 | Japan . |
| 62-28226 | 6/1987 | Japan . |
| 62-182349 | 8/1987 | Japan . |
| 1-60408 | 12/1989 | Japan . |
| 2 258237 | 10/1990 | Japan . |
| 3-36948 | 6/1991 | Japan . |
| 4 49015 | 2/1992 | Japan . |
| 5 228669 | 9/1993 | Japan . |
| 849436 | 9/1960 | United Kingdom . |
| 1181249 | 8/1967 | United Kingdom . |
| WO 91/18735 | 12/1991 | WIPO . |

OTHER PUBLICATIONS

Abstract of Japan 59–169858 (Sep. 25, 1984).
Abstract of Japan 61–154833 (Jul. 14, 1986).
Abstract of Japan 63–203816 (Aug. 1988).
Abstract of Japan 4–370234 (Dec. 1992).
Abstract of Japan 6–10233 (Jan. 1994).
Abstract of U.S.S.R. 1115915 (Sep. 30, 1984).

*Primary Examiner*—Leo B. Tentoni
*Attorney, Agent, or Firm*—Hollander Law Firm, P.L.C.

[57] ABSTRACT

An ultra-high molecular weight polyolefin having a viscosity average molecular weight of at least 500,000 is subjected to melt forming into a film, the thus obtained molten film or solid state film is transversely stretched while holding both the side edges of the film, the stretched film is longitudinally slitted into tapes, and then the thus obtained tapes are longitudinally stretched thereby to produce high-strength yarns easily. A number of slits are longitudinally or transversely made in films made of an ultra-high molecular weight polyolefin having a viscosity average molecular weight of at least 500,000 so that the films each take a meshy form when spread in the direction perpendicular to the slits, and the meshy form structures are stretched in the direction of the slits to prepare meshy webs having a high strength unidirectionally. At least one member selected from the thus prepared meshy webs is used as one nonwoven web, thereby producing a high-strength, web-crossed laminated non-woven easily.

18 Claims, 9 Drawing Sheets

PROCESS OF MAKING HIGH-STRENGTH YARNS

BACKGROUND OF THE INVENTION

1. Field of the Invention

This invention relates to a process for producing high-strength yarns or split yarns by slitting an ultra-high molecular weight polyolefin film into tapes and longitudinally stretching the tapes at a high stretch ratio, and also relates to a high-strength, webs-crossed laminate and a process for producing thereof using a meshy web having a unidirectionally high-strength as a longitudinal or transverse web in which adjacent yarns remains connected to each other by making slits in a web intermittently or in a shape of perforated line.

2. Related Background Art

Methods for producing high-strength yarns from an ultra-high molecular weight polyolefin material which have heretofore been known, include a method comprising dissolving the polyolefin material in a solvent, forming the resulting solution into films or threads and then superstretching the films and threads (Solvent method, Japanese Patent Publication Gazette No. Sho 37-9765), a method comprising extruding the polyolefin material and wax or the like in admixture as a variation of said solvent method (Japanese Patent Application Laid-Open Gazette No. Sho 62-182349), a method comprising continuously pressing powdered ultra-high molecular weight polyolefin for superstretching (Continuous press method, Japanese Pat. Appln. Laid-Open Gazettes Nos. Hei 2-258237 and 4-49015), and a method comprising extrusion forming an ultra-high molecular weight polyolefin to obtain an inflation film and then producing high-strength yarns therefrom (Inflation film method, Japanese Pat. Appln. Laid-Open Gazettes Nos. Sho 62-104911 and 62-122736).

The solvent method is excellent in producing yarns having good performances, but the use thereof costs the dissolution and the solvent removal and is not feasible as an industrial means from the standpoint of cost.

The continuous press method does not need a solvent and enables a higher molecular weight material to be used therein as compared with the following inflation method since the former method is not restricted to extrusion forming unlike the latter inflation method, whereby it is made advantageous in obtaining high-strength products while it raises a problem as to difficulties in producing fine yarns since it can hardly produce thin films and a continuous press apparatus for carrying it out is unsatisfactory in productivity.

The inflation method is satisfactory in productivity since it is capable of extrusion forming, but it is defective in that it cannot use a high molecular weight polyolefin in an ordinary extruder for carrying it out and it cannot effect high-ratio stretching and provide high-strength products because of entanglement of the polyolefin molecules due to melting thereof at the time of extrusion forming.

On the other hand, there have heretofore been proposed a method for producing meshy webs which comprises stretching a film such as a polyethylene or polypropylene film, and a webs-crossed laminated nonwoven fabrics made of these meshy webs. Thus, such webs-crossed laminated nonwoven fabrics are produced in quantities.

These nonwoven fabrics are good in productivity as compared with the woven ones by about two figures, are lighter in weight and more dimensionally stable than conventional nonwoven fabrics and have been used as a reinforcing material paper and films.

Further high-strength and highly dimentionally stable products, however, have been sought to be developed as various reinforcing materials for civil engineering and construction industry.

SUMMARY OF THE INVENTION (First Aspect of the Invention)

A first object of this invention is to eliminate the defects of the conventional methods due to poor processability of an ultra-high molecular weight polyolefin and establish a method which can produce high-strength yarns with good productivity and at a low cost.

To improve the productivity, a method for forming films by extrusion forming is the most suitable. However, the method should be such that it can form a higher molecular weight polyolefin than heretofore used, at a high production rate without causing extrusion abnormality such as melt fracture, and is required to provide a method which can effect high-ratio stretching while lessening the entanglement of polyolefin molecules which raises a problem as to melt extrusion.

Said first object of this invention is, in other words, to provide film forming and film stretching methods which have good productivity for manufacturing high-strength yarns by employing an ultra-high molecular weight polyolefin as the raw material.

In this invention, a method for the manufacture of films by melt forming is basically employed to solve the above problems. The reason for this is that the above method is the most excellent in productivity, the cost of an equipment is low and the operation cost is also low. For the melt forming method, an extrusion forming method by a screw extruder or ram extruder is the most suitable.

The extrusion forming method is defective in that when a high molecular weight polymer is attempted to be extruded, the extrusion power will sometimes be insufficient, and the screw is broken due to high viscosity of polymer. Further, since the shear stress at the nozzle is too large, the dies and barrels may not be resistant to the extrusion pressure caused by the resin. The defects are attempted to be overcome by raising the temperature of resin, mechanically enhancing the pressure resistance on dies or using a special extruder in which the land of the dies is made extremely small thereby to decrease the shear stress and lessen the pressure friction in the die. This invention, independently of or in combination with the above defect-overcoming means, have overcome the above defects by blending the ultra-high molecular weight polymer and material (hereinafter referred to as "thermoplastic low molecular material") having lower melting point and lower viscosity compared with the ultra-high molecular weight polymer and having a molecular weight of up to 500,000 or by effecting multilayer co-extrusion to decrease the shear stress.

It is necessary that the extruder have such a high power as to extrude the ultra-high molecular weight polymer. Further, the extruder is desired to be such that the screw thereof withstand high pressure. Still further, the extruder is more desired to be such that it can extrude a mixture of said ultra-high polymer and thermoplastic low molecular weight materials.

The extruder is further desired to be one which allows the use of a large compression ratio and is still of a non-slip type since it uses therein an ultra-high molecular weight polyethylene and paraffin as well as a powdered resin, powdery additives and powdered thermoplastic low molecular weight materials.

To solve the above-mentioned problems, a proper method or methods selected from an increase in a ratio of L/D (the ratio of a distance L between the inlet and outlet of the die to the inner diameter D of an outer die 34, in the case of a screw as shown in FIG. 2 of the attached drawing), the use of a screw which is large in size at its root, and roughening of the barrel side surface can be employed.

As a film forming method, an inflation film method using circular dies and a T-die film method may be used.

Among the T-dies, one in which a multilayer co-extrusion die is used is particularly suited for this invention. It is necessary in the T-die that, for example, the die land be short, the die gap be enlarged and the die temperature be raised since the ultra-high molecular weight polyolefin will cause melt fracture if the shear velocity is high at the die land.

A method using therein a rotary mandrel which is variation of a circular die and disclosed in the aforesaid Japanese Pat. Appln. Laid-Open Gazette No. Sho 62-122736, may also be employed and, however, this method is disadvantageous in that pressure resistance is high at the outer die portion and a molten high molecular weight body can sometimes not be extruded. The present inventors made intensive studies of this disadvantageous point and, as a result, they found that the molten high molecular weight body can be extruded by providing multiple layers of resin flows on the outer die portion and having a low viscous substance flowed in contact with the inside of the outer die. In this case, the flow ratio of the low-viscosity substance is not stable or constant due to a high extrusion pressure of the ultra-high molecular weight polyolefin when an extruder alone is used; thus, the former substance is required to be pushed into the latter polyolefin flow by use of a high pressure pump such as a gear pump or a plunger pump.

After the the extrusion, an ordinary film forming method will be applied to this invention.

In the film formation according to this invention, it is desirable that the draft ratio be not high and, in the case of formation of an inflation film, it is also desirable that the blow up ratio (BUR) be low. The reason for this is that keeping low the orientation of films as much as possible is effective in extremely inhibiting the occurrence of unevenness of film thickness, orientation and crystallization degree, thereby to ensure the subsequent uniform transverse stretching of the film and prevent the unevenness of the denier of the longitudinally stretched products.

It is desirable that water-cooling film forming be applied to the film forming of the ultra-high molecular weight polyolefin according to this invention.

The ultra-high molecular weight polyolefin has a high tension and is therefore difficultly stretchable at a high stretch ratio, but it will be able to be uniformly stretched by a low tensile force for stretching by means of water-cooling film forming.

The problems raised when high-strength yarns are attempted to be produced from molten films are that a high molecular weight polyolefin cannot be stretched at a high stretch ratio since such polyolefin causes molecular entanglement thereof by melting it. The present inventors made intensive studies in attempts to solve these problems and, as a result, they found that somewhat of transverse stretching of a film effected before the step of longitudinal stretching thereof will enable the film to be stretched at a high stretch ratio in the subsequent longitudinal stretching step thereby to obtain high-strength stretched tapes. The reason for this is supposed to be that the width of the film shrinks in the early stage of the longitudinal stretching step so that some lamellas are formed from the transversely stretched molecules and the lamellas are unraveled smoothly by being stretched in the subsequent longitudinal stretching step thereby effecting high ratio stretching. Likewise, there may be provided a step of positively shrinking the film in the transverse direction before the longitudinal stretching thereof; but without being subjected to such a step, the film thermally shrinks in the transverse direction at an early heating stage in the step of longitudinal stretching of the film.

The present inventors also made intensive studies of transverse stretching means and, as a result, they found that a means of stretching a film while holding both the side edges thereof is suited for this invention because said means satisfies conditions desired therein, such as resistance against high tension, ability to set up stretch ratio desired, and hardly any stretching in the longitudinal direction. The means of transversely stretching the film while holding both the side edges thereof may be a tenter means for use for bi-axial stretching. Further, transverse stretching according to a pulley method (British Patent No. 849, 436, U.S. Pat. No. 4,349,500 (or Japanese Patent Publication Gazette No. Sho 57-30368)) is particularly suited for this invention since an apparatus for carrying out this invention is low in cost and simple in operation.

Transverse stretching of this invention may be effected by hot-air stretching. Transverse stretching according to the pulley method can preferably be employed in this invention since this method is characterized in that it allows not only hot-air stretching but also hot-water or steam stretching with which temperature can be easily kept constant. Since a constant temperature prevents the unevenness of stretching, the constant temperature and a simple apparatus are significant factors.

As countermeasures for ununiform stretching corresponding to the ununiformity of film thickness, the thick portion of the film during transverse stretching may be heated with an infrared heater, hot air, or the like, or cool air may be applied to the thin portion.

Transverse stretching can be performed during melting the film. When an ordinary polymer is employed, even if the film is transversely stretched during melting, the effect of molecular orientation is low, and the orientation is not stable. In contrast to this, in this invention, when the ultra-high molecular weight polyolefin is employed, the molecular flow is small even during melting, and a molecular orientation corresponding to the stretch ratio can be obtained stably. As the temperature during melting is high, the tension is small and a transverse stretching apparatus can be simple.

Another characteristic feature of transverse stretching during melting is that if it is performed by using a film obtained by extruding a polymer blended with thermoplastic low molecular weight materials, the thermoplastic low molecular weight materials, which do not sufficiently move to the surface of the film when only film formation is performed, further bleed to the surface during the transverse stretching.

In the transverse stretching during melting, it is important that the temperature be not extremely higher than the melting point of the ultra-high molecular weight polyolefin. This is because if the temperature is extremely higher than the melting point of the ultra-high molecular weight polyolefin, the effect of molecular orientation is small, and it becomes difficult to obtain transverse orientation quantitatively.

Transverse stretching according to the pulley method can be effected by hot-water or steam stretching, as described above. An extruded film formed by ordinary air cooling is not suitable for stretching with hot water or the like since it has a high crystallization degree.

Conventionally, regarding polypropylene, water-cooling film formation with water or hot water is employed often on extrusion. This is because the crystallization degree is decreased by water-cooling film formation so that the stretching temperature can be decreased. Regarding ordinary high-density polyethylene, its crystallization degree does not charge largely even if it is formed into a film by water cooling, and thus does not, largely contribute to a decrease in stretching temperature. Thus, water-cooling film formation is not employed in formation of high-density polyethylene film.

However, it has become apparent that the water-cooling film formation can decrease a stretching temperature of the ultra-high molecular weight polyethylene its by and that it can be stretched in hot water which can heat uniformly. Therefore, it was confirmed that the ultra-high molecular weight polyethylene can be stretched at a uniform temperature with a simple apparatus.

The transverse stretch ratio need not be very high. Moreover, high-ratio transverse stretching sometimes hinders formation of lamellas by shrinkage after transverse stretching. If the transverse stretch ratio is high, subsequent longitudinal stretching becomes difficult, and the unevenness of stretching also become large.

A transverse stretch ratio in an ordinary solid state is 1.5 to 5 times, and preferably 2 to 3 times. When the film is in the molten state, the transverse stretch ratio is 1.5 to 8 times, and preferably 2 to 5 times, which are slightly higher than the values in the solid state.

In this invention, after film formation, thee film is transversely stretched and then slitted longitudinally into tapes, and the thus obtained tapes are stretched longitudinally.

In longitudinal stretching, the stretch zone must be long. As a longitudinal stretching means, roller stretching, hot-air stretching, hot-plate stretching, hot-water stretching, rolling, or the like can be employed. It is desired that such stretching means be employed in combination to perform multistage stretching. When rolling is utilized, the film can be rolled at a predetermined ratio and then slitted longitudinally into tapes, which can be further longitudinally stretched in an ordinary manner. This longitudinal stretching is also included in the scope of this invention.

The longitudinal stretch ratio must be as high as possible, and is usually 10 times or more, preferably 30 times or more, and further preferably 50 times or more.

The ultra-high molecular weight polyolefin used in this invention is a homopolymer or copolymer of olefin, e.g., ethylene, propylene, butene, pentene, hexene or the like. A polymer of α-olefin is desired as it can realize a high crystallization degree, and high-density polyethylene and polypropylene are particularly desired. A material obtained by copolymerizing other polymers to such a polymer is also included. Such an ultra-high molecular weight polyolefin in preferably has a viscosity average molecular weight of 500,000 or more, and more preferably 1,000,000 or more. In ultra-high molecular weight polyethylene, the intrinsic viscosity measured with a 135° C. decalin solution is 5 dl/g or more, and is preferably 10 dl/g or more.

In this invention, if the thermoplastic low molecular weight material, or a special die shown in the following detailed description of the preferred embodiment are used for extrusion, an ultra-high molecular weight polyolefin having a higher molecular weight than in the conventional method can be extruded.

A higher molecular weight leads to a higher potentiality for a higher strength and modulus of a stretched yarn. A low molecular weight polymer cannot be stretched at a high ratio and cannot easily provide a high strength.

A material blended or co-extruded with the ultra-high molecular weight polyolefin must be a thermoplastic low molecular weight material having a lower viscosity than that or the ultra-high molecular weight polyolefin when extruded together with the ultra-high molecular weight polyolefin. This is because a low-viscosity material moderates the difficulty in extrusion of the ultra-high molecular weight polyolefin. Such a material preferably has a molecular weight of up to 500,000, and more preferably up to 100,000. Oil or the like which takes the form of a liquid at room temperature is solidified when cooled. Thus, such a material is also included in the thermoplastic low molecular weight material for the sake of convenience.

An example of the thermoplastic low molecular weight material used in this invention includes polyethylene such as high-density polyethylene, polypropylene, various types of modified polyolefins, various types of waxes, an ethylene-vinyl acetate copolymer, polyamide, polyester, unsaturated polyester, a fluorine-based polymer, a silicone-based polymer, polyethylene glycol, glycerin, a solvent for an ultra-high molecular weight polyolefin, e.g., decalin, and the like.

Polyethylene glycol and glycerin can be removed easily with water in accordance with water-cooling film formation or the like as they are water soluble.

These thermoplastic low molecular weight materials not only moderate the difficulty in extrusion but also contribute to improving the surface physical properties of the yarns, so that they can improve thermal adhesion properties, (dyeability, compatibility with an FRP (Fiber-Reinforced Plastic) matrix, and the like to the yarns.

A low molecular weight material, e.g. , wax, is removed during film formation and stretching steps, and is removed further positively from a product.

Various types of additives, e.g., an adhesive, an antioxidant, an ultraviolet inhibitor, an antislip agent, a lubricant, an antistatic agent, and the like; a coloring agent, e.g., a pigment or a dye; a fire-retardant; and the like can be added to these ultra-high molecular weight polyolefins and thermoplastic low molecular weight materials, in the same manner as in ordinary film extrusion.

As extrusion formation of this invention is performed at a particularly high temperature, there is a fear of oxidation of the ultra-high molecular weight polyolefin. However, when large mounts of antioxidant and heat stabilizer are added to the thermoplastics low molecular weight material, extrusion formation can be performed without degrading the nature of the ultra-high molecular weight polyolefin. This is also a characteristic feature of this invention.

According to this invention, high-strength yarns having a strength of 10 g/d (gram/denier) or more, which is calculated in an ultra-high molecular weight polyolefin (component portion alone, can be manufactured easily, and yarns having a strength of 15 g/d or more and yarns having a strength of 20 g/d or more can also be manufactured. When the amount of thermoplastic low molecular weight material is increased, the strength of the yarns is decreased relatively. Thus, the strength must be calculated by subtracting the weight of the thermoplastic low molecular weight material.

The high-strength yarns of this invention include longitudinally stretched tapes and split yarns made by the splitting thereof.

The definite strength of the yarns that achieve a high strength and a high modulus through high-ratio stretching depends on the type of the ultra-high molecular weight polyolefin and the property and content of the thermoplastic low molecular weight material mixed in the ultra-high molecular weight polyolefin.

When split yarns that are not twisted are measured, they exhibit a strength which is about 80 to 90% that of the tapes before splitting. However, when split yarns are subjected to optimum twisting, they can exhibit a higher strength than that of the tape.

(Second Aspect of the Invention)

A second object of this invention is to provide a meshy webs-crossed laminated nonwoven fabric having higher strength and higher modulus than those of a conventional equivalent, and to establish a process for producing the meshy webs-crossed laminated nonwoven fabric at a high productivity.

An ultra-high molecular weight polyolefin is employed as the raw material polymer, since it can basically has high strength although its processability is poor.

In other words, the second object of this invention is to produce a high-performance stretched web and web-crossed laminate (or web-crossed laminated nonwoven) by using the ultra-high molecular weight polyolefin resin having a poor processability. More specifically, the second object of this invention is to provide a process for producing unidirectionally high-strength meshy webs from an ultra-high molecular weight polyolefin as a raw material, webs-crossed laminates using such a high-strength meshy web as at least one of a longitudinal nonwoven web and a transverse nonwoven web, and a process for producing such webs-crossed laminates.

In order to solve the above problem, the present inventors made intensive studies, and reached the following means. More specifically, in order to achieve the second object of this invention, according to a second aspect of this invention, there is provided a process for producing meshy webs having a unidirectional strength, comprising the steps of making a number of slits longitudinally or transversely in films made of an ultra-high molecular weight polyolefin having a viscosity average molecular weight of at least 500,000 so that the films each take a meshy form when spread in the direction perpendicular to the slits, and stretching the meshy form structures in the direction of the slits.

It is preferable that this invention include the step of forming the ultra-high molecular weight polymer into a film. This is because to start manufacture from a film is the best-productivity process for producing meshy webs.

As a method for forming a film, film formation after dissolution in a solvent or melt formation can be employed.

As film formation, a casting method, an inflation film method using a circular die, and a T-die film method are available, each of which can be employed in this invention.

In melt formation, since ultra-high molecular weight polyolefin has a high melting viscosity, the friction in the die becomes large to cause melt fracture, leading to a difficulty in extrusion forming. When, however, the molecular weight is low, a high-performance product cannot be expected. The present inventors found the above-described two methods in which an ultra-high molecular weight polyolefin having a higher molecular weight than in the conventional method can be used.

According to the first method, a thermoplastic low molecular weight material as a low-viscosity component, e.g., paraffin wax, is mixed.

According to the second method, the thermoplastic low molecular weight material is co-extruded from a multilayer co-extrusion die.

When the thermoplastic low molecular weight material is employed as a prospective surface layer and a resin serving as an adhesive layer during laminating the longitudinal and transverse webs is used, it helps in improving the surface physical properties of the laminate, thus serving multipul purposes at a time.

Also, means that are employed in ordinary film formation, e.g., to increase the extruding temperature, to use a die having a low die resistance, and to employ a special extruder, may be employed.

To cool a film extruded from the extruder, ordinary film forming method can be used unchanged, and water-cooling film formation is particularly suitable. Since ultra-high molecular weight polyolefin has a high tension, it is difficult to perform high-ratio stretching with it. When water-cooling film formation is employed, the ultra-high molecular weight polyolefin can be stretched uniformly with a low tension.

According to the second aspect of this invention, after meshy slits are formed unidirectionally in the formed film, the film is stretched at a high ratio in the direction of the slits, thereby manufacturing meshy webs having a high strength in the stretching direction. It was also found that, in order to obtain a higher strength, it is preferable that first the molecules be oriented unidirectionally by stretching or the like, slits be formed in the form of meshes in a direction perpendicular to the initial molecular orientation (to be referred to as pre-orientation hereinafter), and thereafter the webs be stretched in the direction of the slits.

When the pre-orientation direction is longitudinal, longitudinal orientation may be effected by longitudinal drafting during film formation, or longitudinal stretching, rolling, or the like after film formation may be employed.

When the pre-orientation direction is transverse, a transverse orientation means that uses a high blow-up ratio (BUR) at the time of inflation film formation may be employed. Transverse orientation can also be effected by transversely stretching the molten or dissolved film, or by transversely stretching the formed film. With an ordinary polymer, when the molten or dissolved film is stretched, the orientation degree of the molecules is low. In contrast to this, a high molecular weight polymer has a high viscosity even in a molten state, and its molecules are oriented by stretching.

In this pre-orientation, the orientation need not be complete, and is preferably 1.5 to 5 times, and more preferably about 2 to 3 times when expressed as the ratio of ordinary stretching. In stretching or drafting of a molten film, the ratio becomes higher than this range.

Subsequently, meshy slits are formed in the direction perpendicular to the pre-orientation direction, and the film is stretched in the direction of the meshy slits. It is supposed that by this stretching, the film shrinks in the direction perpendicular to the pre-orientation direction, and the lamellas formed by this shrinkage are stretched in the direction of the meshy slits, so that the lamella molecules are unraveled smoothly, thereby effecting high-ratio stretching. In this respect, the step of causing thermal shrinkage before stretching in the direction of the meshy slits, thereby causing positive widthwise shrinkage, may be provided.

However, the film shrinks widthwise in the early heating stage of the stretching step, which replaces the above step.

As a longitudinal stretching means in production of meshy webs, roller stretching, rolling, hot-air-stretching, hot-plate stretching, hot-water stretching, and the like that are identical to those employed in the production of the high-strength yarns described above, can be employed. It is desired that such stretching means be employed in combination to perform multistage stretching.

The present inventors made intensive studies on the transverse stretching means of this invention and, as a result, they found that the stretching means that are identical to those employed in the production of the high-strength yarns are desired due to the same reason as that described regarding production of the high-strength yarns.

Transverse stretching is also preferably performed in the form of multistage stretching so that high-ratio stretching is effected.

In this invention, a number of slits are formed in the films in the longitudinal or transverse direction so that each film takes a meshy form when spread in the cross direction against slits direction.

Slitting methods are disclosed in, e.g., Japanese Patent Publication Gazettes Nos. Sho 60-37786, 61-11757 and 61-23104, and Japanese Pat. Appln. Laid-Open Gazette No. Hei 5-228669 that are filed by the present inventors.

In this invention, meshy slits are formed in the films in the machine direction or the cross direction of the film formation (longitudinal or transverse direction), and the films are stretched in the direction of the slits, thereby manufacturing a longitudinally or transversely stretched meshy web.

High-ratio stretching must be performed in this invention. When an ultra-high molecular weight polymer film having a particularly large width is stretched at a high ratio, cracks may be formed therein easily, or stretching itself becomes difficult. Stretching after slitting can eliminate these problems.

Stretching after slitting is preferably performed at a stretch ratio higher than that in ordinary polyolefin stretching. The stretch ratio in invention is preferably 10 times or more although that in an ordinary polyolefin film is ordinarily 6 to 8 times. A higher ratio is preferable in a polyolefin film which has initially been subjected to pre-orientation, and such a film is stretched at a stretch ratio of 20 times or more, preferably 30 times or more, and more preferably 50 times or more.

The strength of a web stretched in the longitudinal or transverse direction is 10 g/d or more, and is preferably 15 g/d or more, and most preferably 20 g/d or more.

When the longitudinal web obtained by this invention is stretched after slitting in accordance with proximity stretching, the obtained meshy form is spread widthwise to form a high-strength meshy longitudinal web. Usually, the web must be spread widthwise to form a predetermined mesh. The widthwise spreading method is disclosed in, e.g., Japanese Patent Publication Gazette No. Sho 46-4,3275, U.S. Pat. No. 3,904,334 (or Japanese Patent Publication Gazette No. Sho 50-40186), and Japanese Patent Publication Gazette No. Sho 51-30182.

The existing web laminating technique (an be employed unchanged as the web laminating technique of this invention.

An example of the web laminating technique of this invention is an overlapping method (Japanese Patent Publication Gazette No. Sho 44-222:31 and the like) employed in an ordinary nonwoven fabric. Although this method is advantageous in that it can be effected with a simple apparatus, it is disadvantageous in that it has a poor productivity, the transverse webs are directed obliquely, the transverse webs form a laminated lap (adjacent transverse webs overlap partly with each other), a lightweight web is difficult to manufacture, and the like.

As a method of using a web laminator, a method is available which is previously proposed by the present inventors in U.S. Pat. No. 3,853,662, U.S. Pat. No. 3,859,156, U.S. Pat. No. 4,052,242 (or Japanese Patent Publication Gazettes Nos. Sho 49-48580, 50-401885, 53-38783) and Japanese Patent Publication Gazettes Nos. Sho 55-51058 and 57-54581, and the like. Although this method has a good productivity, it is defective in that the transverse webs form a laminated lap.

A web laminating method for laminating transversely stretched webs and longitudinal webs is available (U.S. Pat. No. 4,349,500, U.S. Pat. No. 4,525,317, U.S. Pat. No. 4,992,124 (or Japanese Patent Publication gazettes Nos. Sho 57-30,368, Hei 1-60408, Hei 3-36948), Japanese Patent Publication Gazette No. Sho 62-28226, and the like). The characteristic feature of this method is that it has a good productivity and it is free from a laminated lap formed on transverse webs. As the transversely stretched webs of this invention have a high stretch ratio, they are particularly suitable for an ultra-high molecular weight polymer film which is difficult to form with a large width.

In the web-crossed laminate of this invention, at least one of the longitudinal and transverse webs that are laminated to cross each other is a web produced from an ultra-high molecular weight polyolefin of this invention, and the other one may be a longitudinal or transverse web used in an ordinary web-crossed laminate.

In this case, yarn web produced in accordance with other producing processes may be used as other webs.

After the longitudinal and transverse webs are laminated to cross each other, they must be bonded by adhesion. Various types of methods can be employed for adhesion bonding. For example, emulsion adhesion, hot-melt adhesion, adhesion with a powder adhesive, heat melt adhesion, ultrasonic adhesion, and the like can be employed. Of these adhesion methods, what is particularly effective is the one in which an adherent material is co-extruded during film formation to perform adhesion with this adherent material. This is effective not only for adhesion but also in decreasing the friction in the die during film formation.

The web-crossed laminate of this invention has a web strength in the longitudinal or transverse direction of at least 5 g/d and preferably 7 g/d or more. As described above, the longitudinally and transversely stretched meshy webs of this invention have a strength of 10 g/d or more. When they are laminated to cross each other, the entire strength becomes about half due to the presence of a component that does not contribute to the strength (a transversely stretched web (component if the longitudinal strength is in question). To perform web-crossed laminating, an adhesive layer for adhering the longitudinal and transverse webs is required, and the entire strength often becomes smaller than that of the stretched meshy webs made of ultra-high molecular weight polyolefin.

When the web-crossed laminate of this invention is compared with a commercially available meshy web-crossed laminate (nonwoven fabric of split-fiber web-crossed laminate), the former has a strength 3 times or more that of the latter as the latter has a longitudinal or transverse strength of about 1.5 g/d.

The ultra-high molecular weight polyolefin used in the manufacture of the meshy web and the web-crossed laminate of this invention can be the same as that used for the manufacture of the high-strength yarn described above.

In the manufacture of the meshy web, if a thermoplastic low molecular weight material is employed in combination or a special die is used, an ultra-high molecular weight polyolefin having a higher molecular weight than in the conventional method can be used. Regarding the thermoplastic low molecular weight material blended or co-extruded with the ultra-high molecular weight polyolefin, those which are used in the manufacture of the high-strength yarn can be employed.

These thermoplastic low molecular weight materials not only moderate the difficulty of extrusion but also contribute to improving the surface physical properties of the web, thus improving the thermal adhesion properties, the dyeability, the compatibility with the FRP or FRTP (Fiber-Reinforced ThermoPlastic resin) matrix, and the like to the webs.

Furthermore, an adhesive, a dye, and the like can be added to the thermoplastic low molecular weight materials, and the ultra-high molecular weight polyolefin can be extruded without degrading its nature by adding large amounts of antioxidant and heat stabilizer to it. These are also the characteristic features of this invention, as in the manufacture of the high-strength yarn.

BRIEF DESCRIPTION OF THE DRAWINGS

FIGS. 1A and 1B show an example of an apparatus that longitudinally slits a film into tapes after the film is subjected to transverse stretching under melting in T-die film formation, in which FIG. 1A is a plan view and FIG. 1B is a side view;

FIGS. 4A and 4B show an example of an apparatus in which a thermoplastic low molecular weight material and an ultra-high molecular weight polyolefin are merged in the adapter of the extruder and co-extruded in T-die film formation, in which FIG. 4A is a front view and FIG. 4B is a side view;

FIGS. 8A and 8B show an example of an apparatus for forming meshy slits in a film after the film is subjected to transverse stretching under melting in T-die film formation, in which FIG. 8A is a plan view and FIG. 8B is a side view;

DETAILED DESCRIPTION OF THE PREFERRED EMBODIMENTS

The preferred embodiments of this invention will be described in detail with reference to the accompanying drawings.

EXAMPLES 1 TO 4 AND COMPARATIVE EXAMPLES 1 AND 2

Figure 1A:
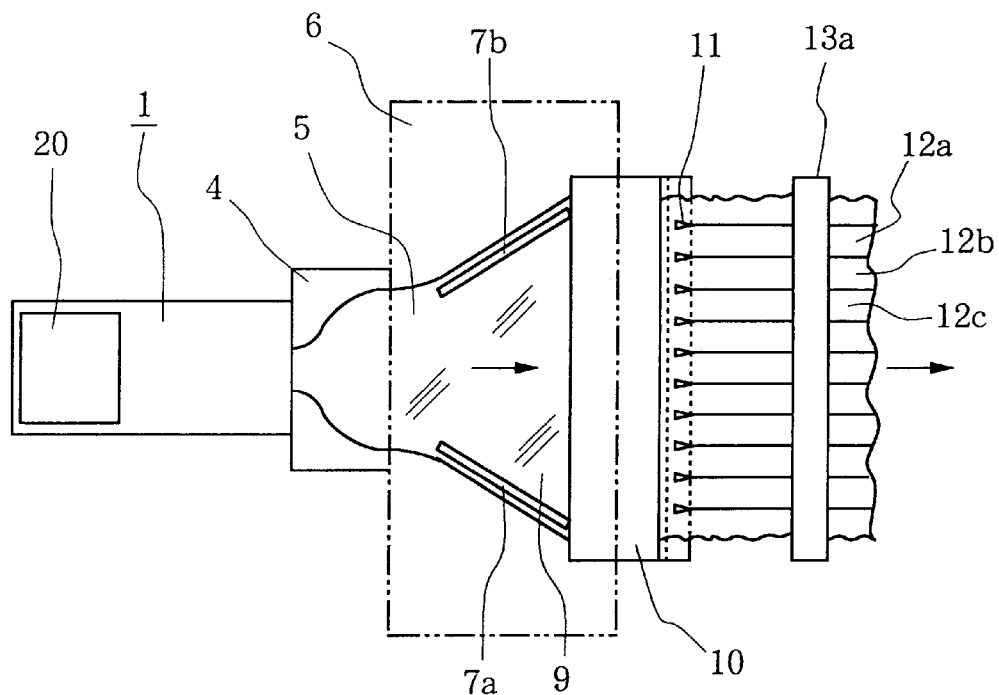
Figure 1B:
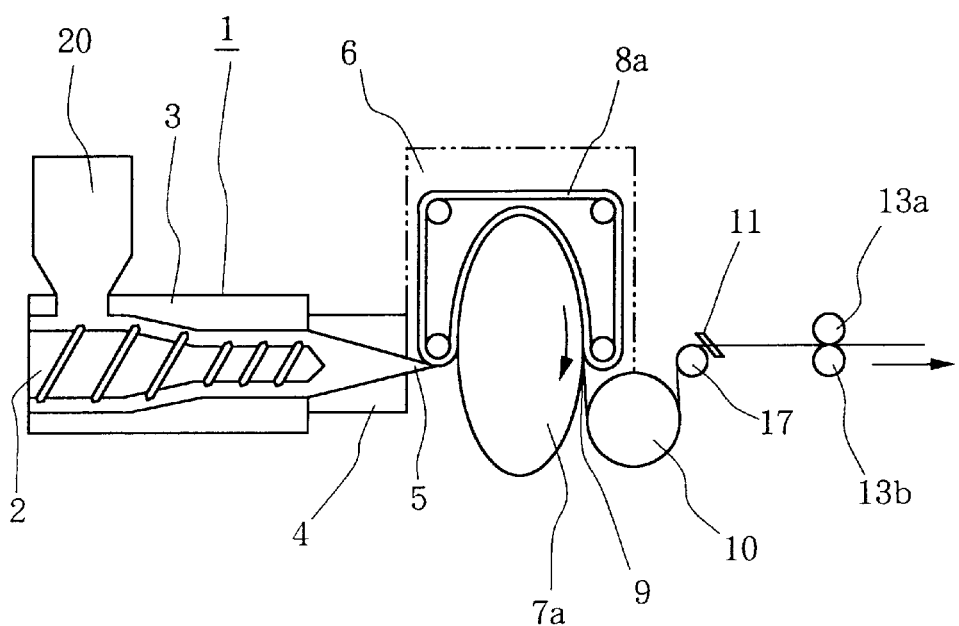

FIGS. 1A and 1B show T-die film formation and transverse stretching in the molten state of this invention, in which FIG. 1A is a plan view and FIG. 1B is a side view.

An extruder 1 uses a screw 2 with a large-diameter root. Since the root of the screw 2 is large, a high-power motor can be used, and even if the power is large, the screw 2 will not be broken. In order to ensure feeding, it is effective to form a barrel 3 side to have a rough surface. The characteristic feature of extruder 1 also resides in that it can reliably extrude even a mixture mixed with a low-viscosity wax or the like.

An ultra-high molecular weight polyolefin material, or a mixture thereof with a thermoplastic low molecular weight material charged through a hopper 20 and melted and kneaded by the extruder 1 is guided to a T-die 4, and is extruded as a film (or a sheet) 5. As this film 5 is to be transversely stretched, it must be extruded thick accordingly.

The extruded film 5 is transversely stretched by a pulley type transverse stretching apparatus in a hot-air chamber 6 without being solidified. The transverse stretching apparatus holds the both side edges of the film with a pair of stretching pulleys 7a and 7b and belts 8a and 8b (the belt 8b is not illustrated in FIG. 1B as it is behind the belt 8a and thus cannot be seen, and the belts 8a and 8b are not illustrated in FIG. 1A to avoid complicated drawing) that fit with the pulleys 7a and 7b and circulate, so that the film is transversely stretched by a divergent track between the two pulleys 7a and 7b. Due to the hot air of the hot-air chamber 6, the film is not solidified in the stretching process. After stretching, a transversely stretched film 9 is cooled by a cooling roll 10, and is slitted into a number of tapes 12a, 12b, 12c, . . . with a large number of razor (razor blade) slitters 11 arranged at a predetermined pitch. The tapes 12a, 12b, 12c, . . . are taken up by nip rolls 13a and 13b, and are guided to a subsequent longitudinal stretching step.

The transverse stretching system for film formation shown in FIGS. 1A and 1B also applies for mixing a thermoplastic low molecular weight material and extruding the obtained mixture. During film formation or in the process of melt transverse stretching, most of the thermoplastic low molecular-weight material is gradually bled on the surface of the film.

It is desired that in FIGS. 1A and 1B the draft ratio after film formation before the transverse stretching apparatus be not high. If the draft ratio is high, the effect of transverse stretching cannot be obtained unless the transverse stretch ratio is increased, and in transverse stretching, the unevenness in transverse stretching become large. Usually, the longitudinal draft ratio is preferably within the range of 1 to 3.

When a T-die having a multilayer die is used as tie T-die shown in FIGS. 1A and 1B, a multilayer extruded film having the thermoplastic low molecular weight material as its surface layer can be obtained.

Figure 2:
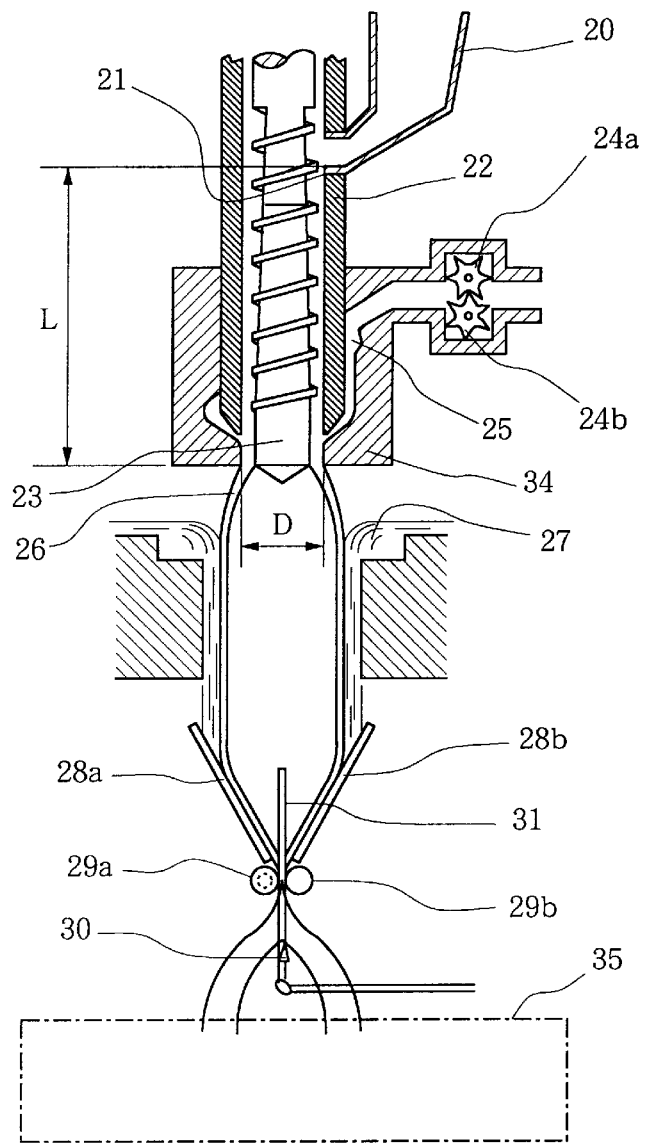
FIG. 2 shows an example of a film forming apparatus which co-extrudes an ultra-high molecular weight polyolefin and a thermoplastic low molecular weight material in tubular water-cooling film formation.

FIG. 2 shows an example of film formation according to the inflation method.

An ultra-high molecular weight polyolefin material is charged through a hopper 20 and extruded by an extruder 22 comprising a screw 21. A distal end portion 23 of the screw 21 is not provided with screw blades and serves as a rotatable mandrel.

A thermoplastic low molecular weight material is fed by gears 24a and 24b of a gear pump, distributed around the barrel by a manifold 25, covers the circumferential portion of the molten body of the ultra-high molecular weight polyolefin at the rotatable mandrel portion 23 to form the surface of an inflation film 26, and is extruded.

The inflation film 26 is cooled with water 27 within a range not to form a frost line therein, passes through guide plates 28a and 28b and nip rolls 29a and 29b, is cut open with a knife 30, and is guided to a transverse stretching step 35. The internal pressure of the bubble of the inflation film 26 is controlled by guiding internal pressure adjusting air through a pipe 31.

As the water-cooling film formation, methods disclosed in U.S. Pat. No. 3,904,334 (or Japanese Patent Publication Gazette No. Sho 47-47084), and Japanese Patent Publication Gazette No. Sho 48-229886 that are previously filed by the present inventors are effective as the ultra-high molecular weight polymer inflation film has a high internal pressure. Among these methods, one described in U.S. Pat. No. 3,904,334 that uses a net and one that uses a coil ring are particularly suitable.

Figure 3:
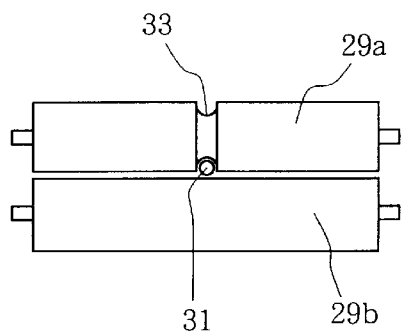
FIG. 3 shows how to introduce an inflation internal pressure adjusting air introducing pipe in the film forming apparatus shown in FIG. 2.

A groove 33 is formed in the nip roll 29a, as shown in FIG. 3, to place the pipe 31 therein.

The thermoplastic low molecular weight material can be fed by another high-pressure pump, e.g., a high-pressure extruder although FIG. 2 shows a case in which the thermoplastic low molecular weight material, is fed by a gear pump.

Figure 4A:
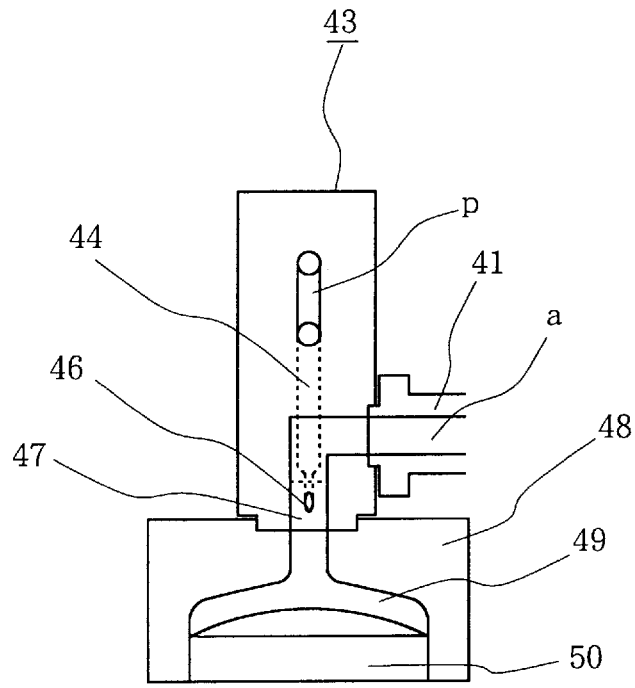
Figure 4B:
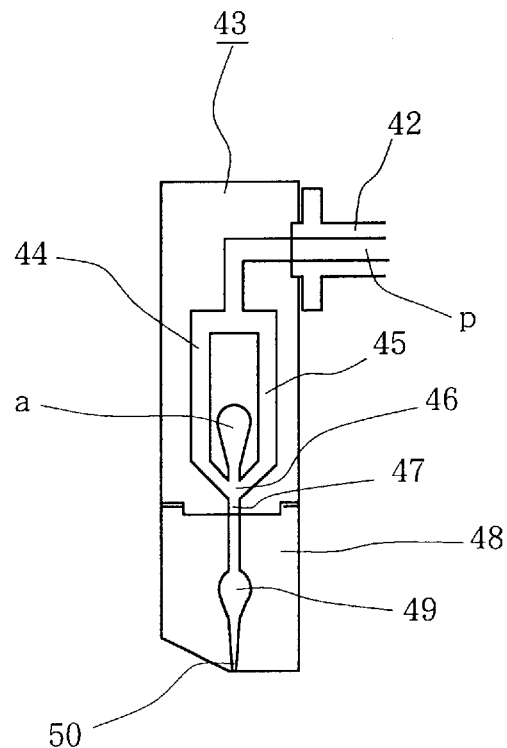

FIGS. 4A and 4B show a case wherein ultra-high molecular weight polyolefin a and a thermoplastic low molecular weight material p form a film with a three-layer co-extrusion T-die, in which FIG. 4A is a front view and FIG. 4B is a side view.

As a three-layer co-extrusion T-die, although a three-layer internal laminate type manifold flat die (multi-manifold die) can be used, it has a complicated structure and not only leads to an expensive die but also has a high internal pressure, thus easily causing melt fracture. FIGS. 4A and 4B show a method in which the ultra-high molecular weight polyolefin a and the thermoplastic low molecular weight material p are merged in an adapter 43.

In the apparatus shown in FIGS. 4A and 4B, the ultra-high molecular weight polyolefin molten resin a is kneaded and extruded by an extruder (not shown) and guided to the adapter 43 through a guide pipe 41. The thermoplastic low molecular weight material p is kneaded by another extruder (not shown), guided to the adapter 43 through a guide pipe 42, separated into branch pipes 44 and 45 in the adapter 43, and is merged with the ultra-high molecular weight polyolefin a on the upper and lower surfaces thereof at a merge point 46 in the adapter 43. A flow 47 of the merged molten resin is guided to a T-die 48, spread along a coat hunger-type groove 49, and guided to a die lip 50. A molten film of the ultra-high molecular weight polyolefin having the layers of the thermoplastic low molecular weight material p on its upper and lower surfaces is extruded from the die lip 50.

The thermoplastic low molecular weight material p kneaded by the extruder is preferably supplied to the adapter 43 with a high-pressure pump, e.g., a gear pump. This is because the ultra-high molecular weight polyolefin a in the adapter 43 has a high melt pressure.

This method in which merging is caused in the adapter in this manner is also called a feed block die or combine adapter method, and can be employed in a multilayer co-extruded film, e.g., a three resin-types three-layers film, a five resin-types five-layers film, and the like. In the case of the five resin-types five-layers film, the core may be made of an ultra-high molecular weight polyolefin, the surface layer of the ultra-high molecular weight polyolefin may be made of an adherent material matching the ultra-high molecular weight polyolefin, and the outermost surface of the film may be made of an adherent material matching the matrix to be adhered.

When the method in which merging is caused in the adapter as in the apparatus shown in FIGS. 4A and 4B is adapted, an ultra-high molecular weight polyolefin having a higher molecular weight, that cannot be conventionally used, can be used, so that a higher-performance stretched tape can be obtained. This method can also be applied to a circular die as shown in FIG. 2.

Figure 5:
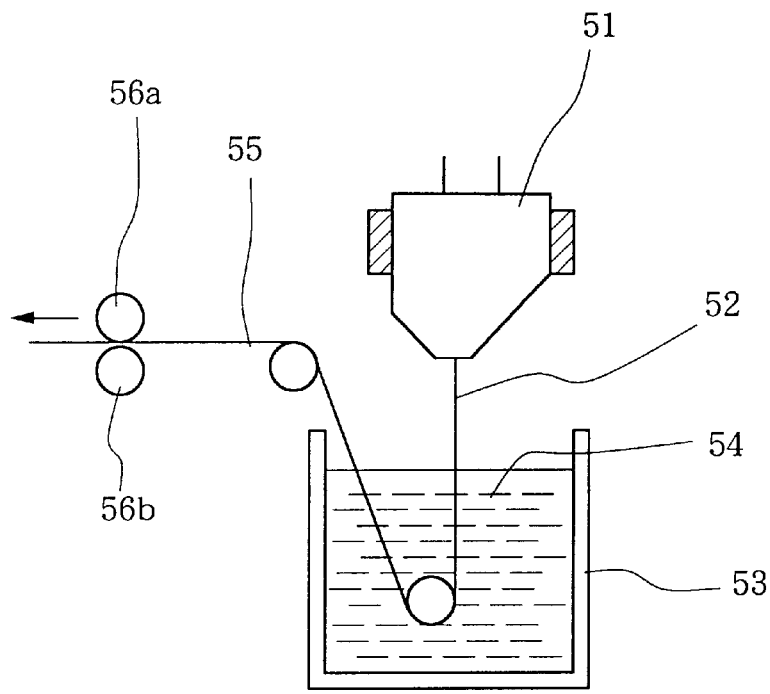
FIG. 5 shows an example of water-cooling film formation in T-die film formation.

FIG. 5 shows an example of water-cooling film formation in T-die film formation. A film 52 extruded from a T-die 51 is cooled with water 54 stored in a tank 53. In this case, it is also preferable that the film 52 be water-cooled within a range not forming a frost line therein. A water-cooled film 55 is guided to a transversely stretching step through nip rolls 56a and 56b.

Figure 6:
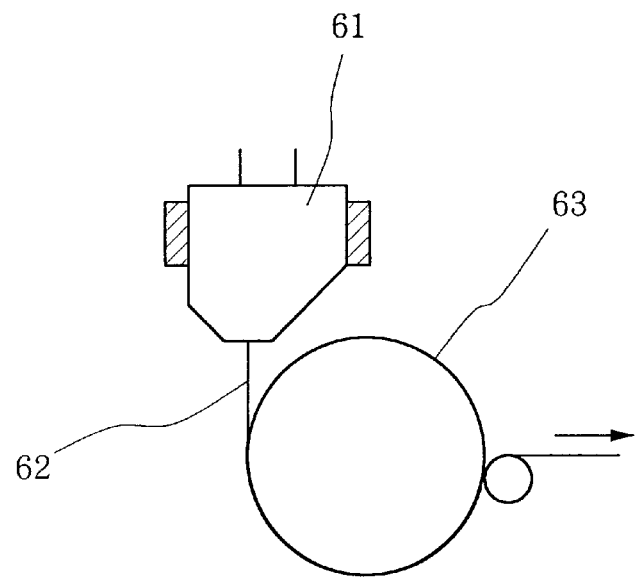
FIG. 6 shows an example of chill-roll film formation in T-die film formation.

FIG. 6 shows another example of the cooling method in T-die film formation. A film 62 extruded from a T-die 61 is cooled by a chill roll 63 and guided to a transverse stretching step.

Figure 7:
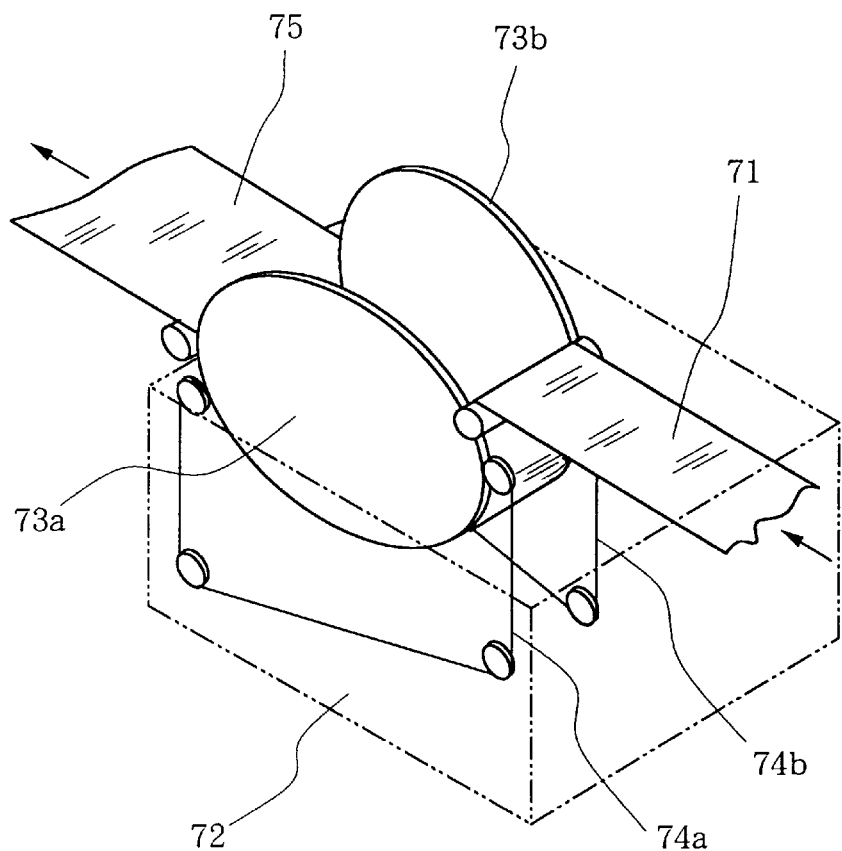
FIG. 7 shows a transverse stretching apparatus according to a pulley method as an example of a transverse stretching apparatus that can perform hot-water stretching.

FIG. 7 shows an example of a transverse stretching apparatus capable of hot-water stretching. A water-cooled and solidified film 71 is guided into a tank 72 storing hot water and transversely stretched by a pulley type transverse stretcher. The transverse stretcher holds the both side edges of the film 71 with a pair of stretching pulleys 73a and 73b that rotate in hot water and belts 74a and 74b that are fitted with the stretching pulleys 73a and 73b to circulate, so that the film is transversely stretched by a divergent track between the two pulleys 73a and 73b. As the water-cooled film can be stretched by the temperature of the hot water, the transverse stretching apparatus can take this simple form.

FIG. 7 shows an example of hot-water stretching. The apparatus shown in FIG. 7 (can also perform steam stretching or hot-water stretching if it is turned upside down and a steam or hot air is stored in the tank 72.

A water-cooled film is suitable for hot-water stretching or steam stretching. An air-cooled film is stretched with hot air as its appropriate stretching temperature exceeds 100° C.

Table 1 shows the physical properties of high-strength ultra-high molecular weight polyolefin yarns of Examples 1 to 4 which are obtained by film formation and stretching in accordance with the method of this invention, the physical properties of a yarn of Comparative Example 1 which uses an ultra-high molecular weight polyolefin having a lower molecular weight than that of Example 1, and the physical properties of a yarn of Comparative Example 2 which is manufactured in accordance with an ordinary method.

TABLE 1

|  | | TFM | | Film forming Apparatus | Resin Temp. ° C. | Film Thickness μm | Transverse stretching Method | Transverse Stretching | | Longitudinal Stretching | | Tensile Strength/ Elongation | |
| --- | --- | --- | --- | --- | --- | --- | --- | --- | --- | --- | --- | --- | --- |
|  | UHP | Type | Wt % |  |  |  |  | Temp. | Ratio | Temp. | Ratio | g/d | % |
| Example 1 | a |  | 0 | FIG. 1 | 300 | 320 | FIG. 1 | 150° C. | 4 | 150° C. | 35 | 24.7 | 2 |
| Example 2 | a | p | 15 | FIG. 1 | 280 | 300 | FIG. 1 | 140° C. | 4 | 150° C. | 42 | 21.2 | 3 |
| Example 3 | a | q | 20 | FIG. 2 | 300 | 280 | FIG. 1 | 125° C. | 2.5 | 150° C. | 32 | 15.1 | 4 |
| Example 4 | b | x | 15 | FIGS. 4 and 5 | 280 | 150 | FIG. 7 | 98° C. | 3 | 158° C. | 17 | 15.8 | 4 |
| Comparative Example 1 | c |  | 0 | FIG. 1 | 300 | 300 | FIG. 1 | 150° C. | 4 | 135° C. | 14 | 11.1 | 5 |
| Comparative Example 2 | a |  | 0 | FIG. 1 | 300 | 180 | — | — | — | 150° C. | 8 | 10.5 | 7 |

Referring to Table 1, UHP stands for ultra-high molecular weight polyolefin. Reference symbol a denotes an ultra-high molecular weight polyethylene having a viscosity average molecular weight of 1,110,000, b denotes an ultra-high molecular weight polypropylene having a viscosity average molecular weight of 850,000, and c denotes an ultra-high molecular weight polyethylene having a viscosity average molecular weight of 280,000.

TFM stands for a thermoplastic low molecular weight material. Reference symbol p denotes a mixture obtained by adding 300 ppm of Irganox 1010 (antioxidant) to San Wax 161-P (paraffin wax manufactured by SANYO CHEMICAL INDUSTRIES, LTD.), q denotes ERO10S (high-density polyethylene manufactured by Mitsubishi Chemical Industries Ltd.). The weight Novate 390P (modified polypropylene manufactured by Mitsubishi Chemical Industries Ltd.). The weight percentage represents a proportion of TFM to UHP.

The outline of the film forming apparatus is indicated by the figure number employed in the preceding description. The resin temperature is that of the die. The film thickness is the one obtained just before transverse stretching. The transverse stretching method is indicated by the figure number employed in the preceding description. Longitudinal stretching was performed as multistage stretching in a free space.

The tensile strength (g/d) and tensile elongation (%) were measured with a chuck distance of 100 mm and a tensile rate of 100 mm/min. based on JIS L 1069.

Example 1 shows a case wherein an ultra-high molecular weight polyethylene was formed into a film and the film was stretched with the film forming apparatus shown in FIGS. 1A and 1B. The screw 2 of the extruder 1 has a root with an outer diameter of 40 mm, a distal end with an outer diameter of 30 mm, and an L/D of 24. A film 5 having a thickness of 320 μm was formed with the T-die 4 having a width of 250 mm. While this film was in the molten state, its two side edges were held with the pair of pulleys 7a and 7b that formed a divergent track in the hot-air chamber 6 and the belts 8a and 8b that circulated on the pulleys 7a and 7b, thereby transversely stretching the film by 4 times by a pulley stretching apparatus that perfromed stretching transversely, to obtain a transversely stretched film 9. The transversely stretched film 9 was cooled with the cooling roll 10 and slitted by the razor slitters 11 into a number of 20-mm width tape-type films 12a, 12b, 12c, . . . . The obtained tapes were taken up by the nip rolls 13a and 13b, and were subjected to the stretching step.

In Example 1, since a thermoplastic low molecular weight material was not used, melt fracture occurred in the film unless the number of revolutions of the screw was set to 10 or less.

Although not shown, according to the stretching step, the film was stretched by three stages at 150° C. in a free space. Flat yarns having a tensile strength of 24.7 g/d and a tensile elongation of 2% were manufactured with a stretch ratio of 35.

In Example 2, 15 weight % of paraffin wax powder having a melting point of 55° C. were mixed as a resin with ultra-high molecular weight polyethylene powder identical to that of Example 1, and the mixture was supplied through the hopper 20. The process for the film formation, the transverse stretching method, an(d the longitudinal stretching method were the same as those of Example 1. Table 1 shows a film forming temperature (resin temperature), a stretching temperature, a tensile strength, a tensile elongation, and the like. In the film forming process, the transverse stretching process, and the longitudinal stretching process, the wax was removed as it gradually bled from the ultra-high molecular weight polyethylene system.

Example 3 shows a case of tubular film formation in accordance with the film forming method of FIG. 2 to have a high-density polyethylene as an outer layer. The blow-up ratio (BUR) was 1.1, and the longitudinal draft ratio was 3. Water-cooling film formation shown in FIG. 2 is the method described in Japanese Patent Publication Gazette No. Sho 47-47084. In Example 3, the temperature of the cooling water 27 was 55° C. After the film formed by tubular film formation was cut open with the knife 30 to form a flat film which was guided to the transverse stretching apparatus 35 identical to that shown in FIGS. 1A and 1B, and was stretched by 2.5 times at 125° C. in the heating chamber. Thereafter, the stretched film was slitted into tapes, and the tapes were subjected to longitudinal stretching in the same manner as in Example 1.

Example 4 shows a case wherein a three-layer film was formed, by using the three-layer co-extrusion T-die shown in FIGS. 4A and 4B as the T-die 51 of the apparatus shown in FIG. 5, to have a (ore made of ultra-high molecular weight polypropylene b and two surface layers made of modified polypropylene. In this case, the water temperature of the water 54 was room temperature (22° C.). The resultant film was transversely stretched in hot water of 98° C. with the transverse stretching apparatus shown in FIG. 7. Thereafter, the film was subjected to longitudinal stretching and the like in the same manner as in Example 1.

Comparative Example 1 is identical to Example 1 except that ultra-high molecular weight polyethylene c having a molecular weight of 280,000 was employed as the raw material. With the ultra-high molecular weight polyethylene c having a low molecular weight, the longitudinal stretch ratio and the tensile strength after stretching were low.

In Comparative Example 2, a film was formed by using an ultra-high molecular weight polyethylene identical to that used in the Example 1. Since transverse stretching was not performed, the longitudinal stretch ratio and the tensile strength after stretching of the resultant film were low.

EXAMPLES 5 TO 9 AND COMPARATIVE EXAMPLE 3

Figure 8A:
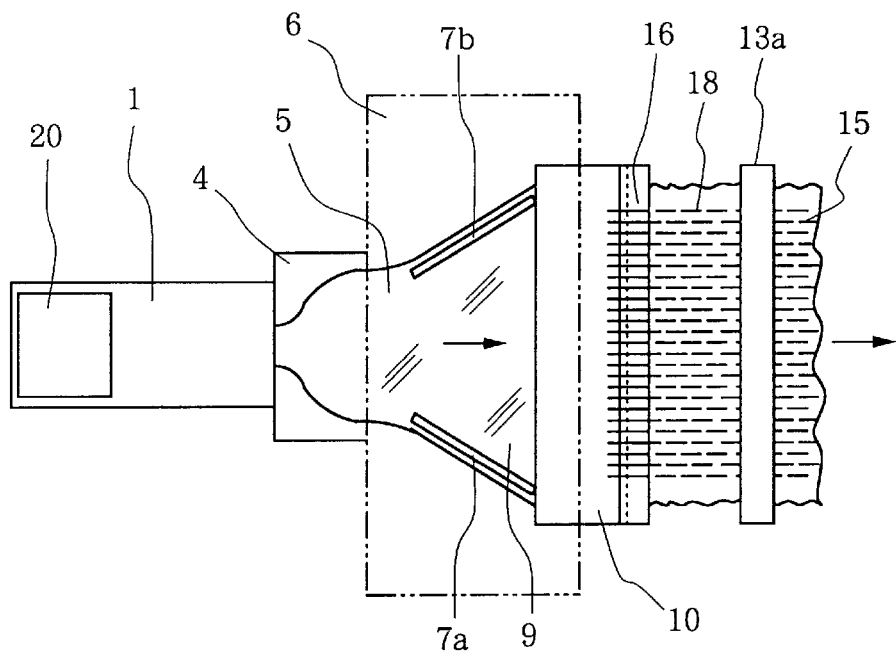
Figure 8B:
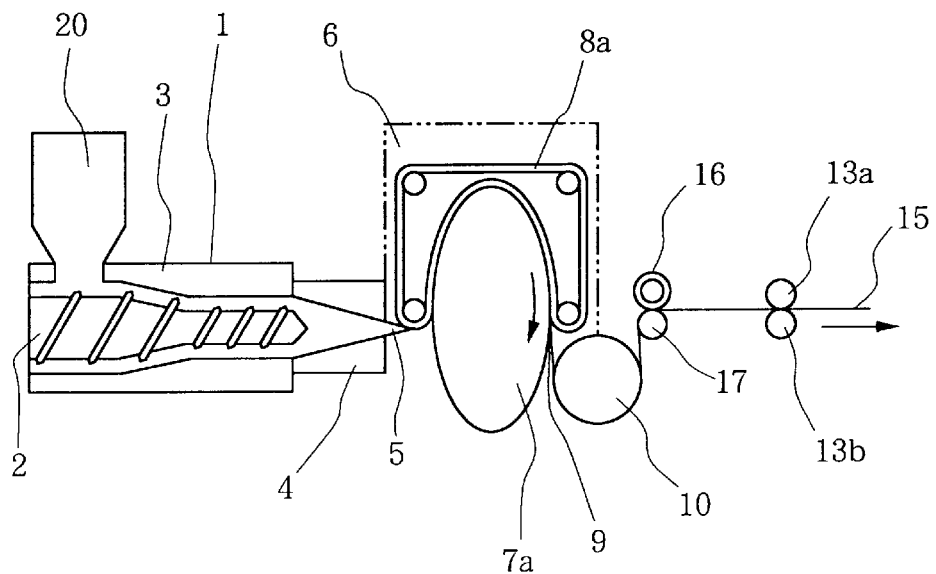

FIGS. 8A and 8B show an example of preliminary processing necessary for T-die film formation and for manufacturing a longitudinally stretched web in the molten state of this invention, in which FIG. 8A is a plan view and FIG. 8B is a side view. When the apparatus shown in FIGS. 8A and 8B is compared with that shown in FIGS. 1A and 1B, longitudinal slitters 16 for forming meshy longitudinal slits in the film are provided in place of the razor slitters 11 shown in FIGS. 1A and 1B for slitting the film at a predetermined pitch. These longitudinal slitters 16 and a back up roll 17 opposing them constitute a longitudinal slitting unit.

An ultra-high molecular weight polyolefin material or a mixture thereof with a thermoplastic low molecular weight material charged through a hopper 20 in the extruder 1 and melted and kneaded thereby, is guided to a T-die 4, and is extruded as a film (or a sheet) 5. When the film 5 is to be transversely stretched, it must be extruded thick accordingly.

The extruded film may be guided to the longitudinal slitters 16 and 17 directly, or after it is cooled with the cooling roll. However, to manufacture a higher-strength web, the extruded film is preferably subjected to the subsequent transverse pre-orientation step.

The extruded film 5 is not solidified in a hot-air chamber 6 but is transversely stretched with pulley-method transversely stretching units 7a and 7b. Due to the hot air of the hot-air chamber 6, the film is not, sometimes solidified in the stretching process. However, since the film is made of the ultra-high molecular weight polyolefin, it has a high melt viscosity, and thus molecular orientation occurs in it.

After being subjected to stretching and transverse pre-orientation, a resultant film 9 is cooled by a cooling roll 10, and a number of longitudinal slits 15 are formed in the film 9 zigzag and intermittently with longitudinal slitters consisting of the longitudinal slitters 16 and the back up roll 17. A web 18 having zigzag intermittent slits in the longitudinal direction is taken up by nip rolls 13a and 13b and is guided to the subsequent longitudinal stretching step.

As an apparatus for effecting transverse pre-orientation, not only this transverse stretching according to the pulley method, but also conventional tenter stretching, a (corrugated roll method (Japanese Patent Publication Gazette No. Sho 59-32307 and the like), and the like can be employed.

As the longitudinal slitting means, one disclosed in previously cited applications and the like of the present inventors can be employed.

The film forming and transverse stretching system shown in FIGS. 8A and 8B also applies for extruding a mixture of an ultra-high molecular polyolefin with a thermoplastic low molecular weight material to form a film and subjecting to the transvers stretching thereof. During film formation or in the process of melt transverse stretching, most of the thermoplastic low molecular weight material is gradually bled on the surface of the film.

It is desired that the draft ratio from film formation to the transverse stretching apparatus shown in FIGS. 8A and 8B be not high. If the draft ratio is high, the effect of transverse stretching cannot be obtained unless the transverse stretch ratio is increased, and in transverse stretching, unevenness in transverse stretch ratio become higher. Usually, the longitudinal draft ratio is preferably within the range of 1 to 3.

When a T-die having a multilayer die is used as the T-die shown in FIGS. 8A and 8B, a multilayer extruded film having the thermoplastic low molecular weight material as its surface layer can be obtained.

An example of the manufacture of a transversely stretched web will be described.

It is possible to slit a film transversely without subjecting the film to longitudinal pre-orientation, and thereafter to stretch the film transversely. However, to manufacture a higher-strength stretched web, it is preferable that the film be subjected to longitudinal pre-orientation in advance. Longitudinal pre-orientation can be effected with longitudinal drafting in an ordinary molten state. However, to obtain a higher-strength transversely stretched web, it is preferable to use a following longitudinal stretching apparatus.

Figure 9:
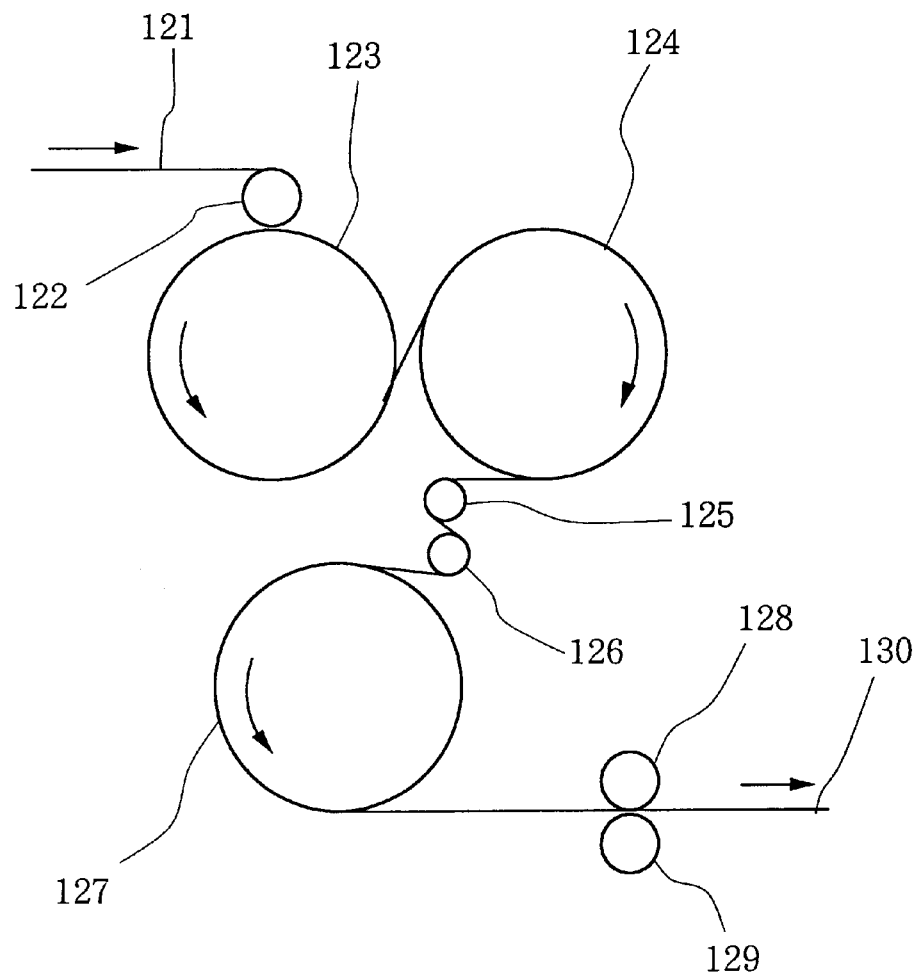
FIG. 9 shows proximity stretching as an example of a longitudinal stretching method.

FIG. 9 shows an example of a longitudinal stretching apparatus when performing pre-orientation in the longitudinal direction. This apparatus is of a method called proximity stretching.

A formed film 121 is passed through a turn roll 122 and preheat rolls 123 and 124 and is guided to stretching rolls 125 and 126. The stretching rolls 125 and 126 have small diameters, and the film 121 is longitudinally stretched between them. Due to the small roll diameters, the stretching distance between the stretching rolls 125 and 126 is short, so that the film 121 is uniformly stretched with a small widthwise shrinkage.

The stretched film is fed to transverse slitting units 128 and 129 through a straightening roll 127, to be transversely slitted zigzag intermittently by the units 128 and 129, and is guided to a transverse stretching apparatus as a transversely slitted web 130.

This apparatus for effecting longitudinal pre-orientation can employ not only this proximity stretching method but also conventional rolling, roll stretching, hot-air stretching, or the like.

As a transverse slitting means, one described in the previous applications of the present inventors described above can be employed.

The transversely slitted web is transversely stretched by the transverse stretching apparatus. As the transverse stretching apparatus, one shown in FIG. 7 can be employed. In this case, the tank 72 shown in FIG. 7 is modified to decrease diffusion of a heating medium, and is used as a heating chamber.

Referring to FIG. 7, the film 71 having transverse zigzag intermittent slits is guided into the heating chamber 71 and is transversely stretched by a pulley method transverse stretcher. The transverse stretch ratio is adjusted by the open angle of the stretching pulleys 73a and 73b. When a high stretch ratio is set, multistage stretching is preferably performed. As the heating medium of the heating chamber 72, hot water, heated air, heated steam, or the like is used.

Figure 10:
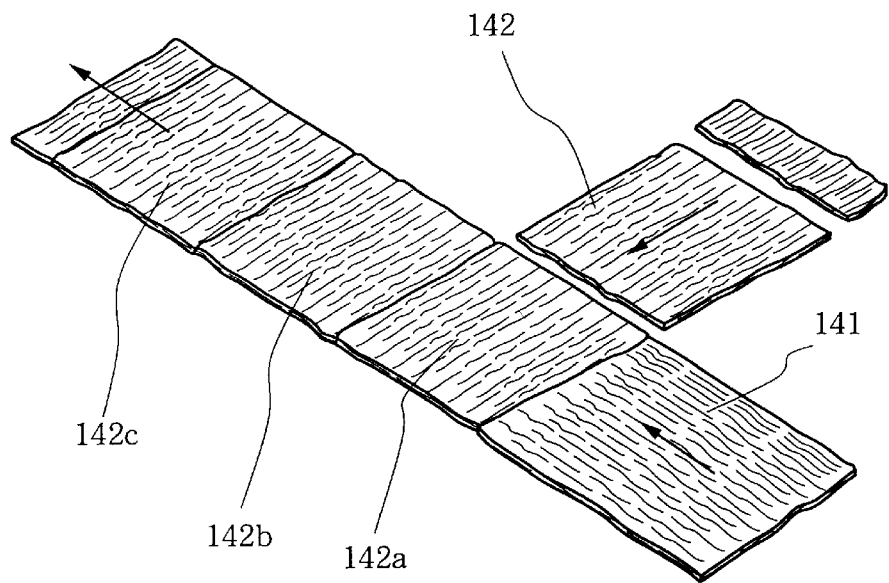
FIG. 10 shows the principle of an example of a web-crossed laminating method which is effected with a web laminator.

FIG. 10 shows the principle of the web laminating method of this invention that uses a web laminating unit. Previous applications of the present inventors concerning a web laminator are already mentioned.

According to this method, a longitudinally stretched meshy web in which molecules are arranged longitudinally is used for each of a longitudinally stretched web 141 and a transverse web 142. The longitudinal web 141 and the transverse web 142 are used after being spread widthwise as required. This is already mentioned regarding the previous applications of the present inventors on the widthwise spreading method.

The web 142 in which the molecules are arranged longitudinally in the same manner as in the longitudinal web 141 is supplied by the web laminator to be perpendicular to the longitudinal web 141, and is cut into portions having a predetermined length corresponding to the width of the longitudinal web 141. The obtained cut transverse webs 142 are laminated (142a, 142b, 142c, . . . ) on the longitudinal web 141. The longitudinal web 141 and the transverse webs 142a, 142b, 142c, . . . are heated and adhered to each other, thereby completing web-crossed laminate webs (Japanese Patent Publication gazette No. Hei 6-15736).

Although this method according to the web laminator has a good productivity, it cannot avoid a lap (overlapping of transverse webs) or a gap between adjacent transverse webs, as is apparent from FIG. 10.

Figure 11:
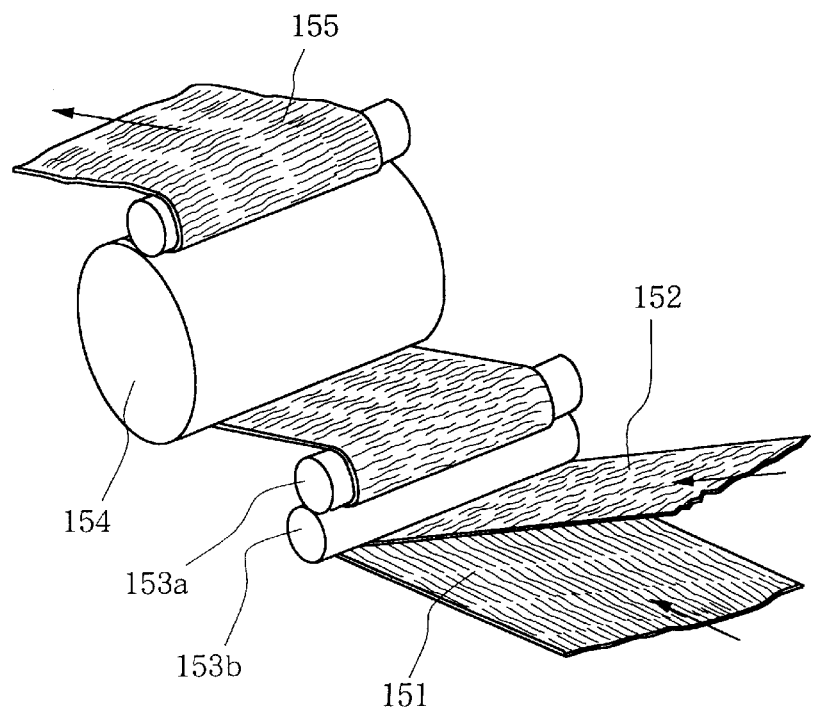
FIG. 11 shows the principle of laminating adhesion of longitudinally and transversely stretched webs, which is an example of the web-crossed laminating method.

FIG. 11 shows the principle for laminating a transversely stretched web and a longitudinally stretched web. Previous applications concerning the laminating method and the like are mentioned above. Reference numeral 151 denotes a longitudinally stretched meshy web. The longitudinally stretched meshy web 151 is used after it is spread widthwise as required, which is the same as in FIG. 10. Reference numeral 152 denotes a transversely stretched web manufactured in accordance with the method shown in FIG. 7 and the like. The webs 151 and 152 are laminated by nip rolls 153a and 153b and heated and adhered to each other by a heating cylinder 154, thus forming a web-crossed laminate 155.

Figure 12:
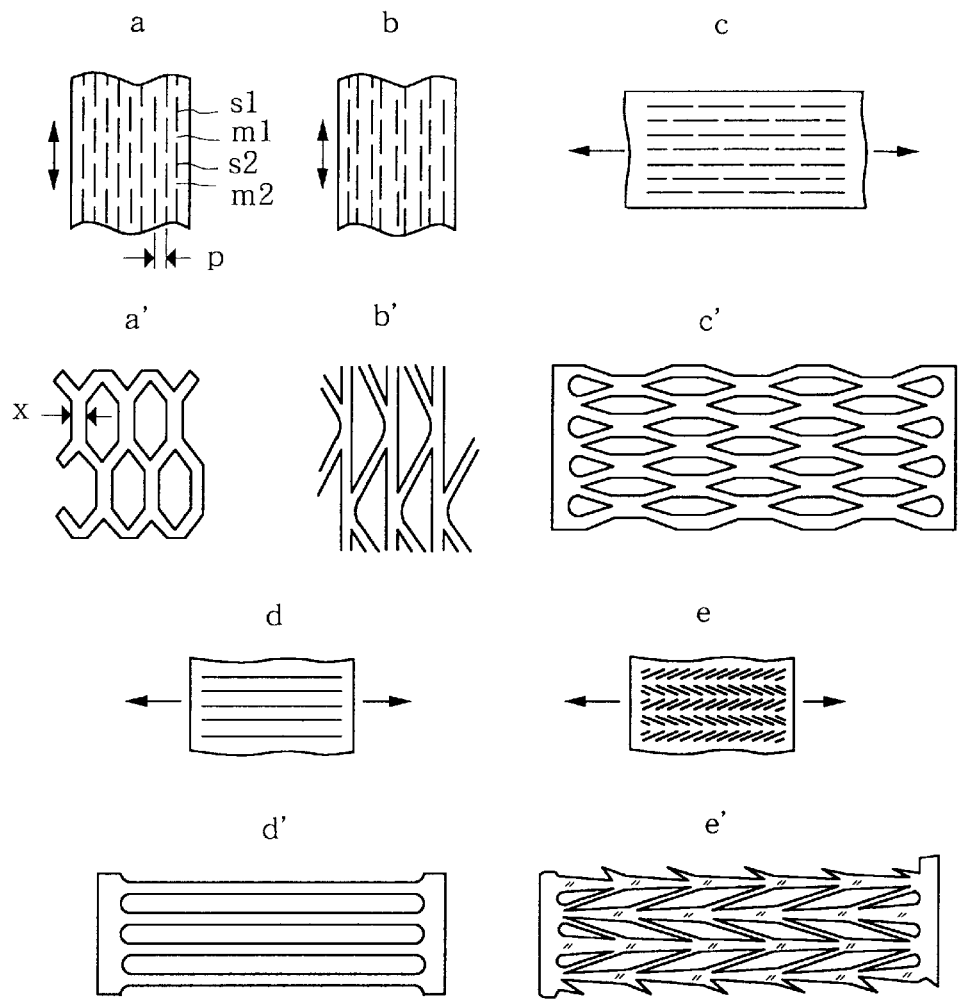
FIG. 12 shows the examples of various types of slit patterns (a, b, c, . . . ) of the films and concepts of patterns (a', b', c', . . . ) obtained by stretching them.

FIG. 12 shows examples of slit patterns formed by this invention. Referring to FIG. 12, reference symbols a and b indicate longitudinal zigzag intermittent slit patterns, and a' and b' indicate slit patterns obtained by longitudinally stretching and widthwisely spreading the slit patterns a and b, respectively. Although the real slit patterns are longitudinally longer several times than the slit patterns a' and b' and their film widths are narrower accordingly in practice, they are simplified for the sake of easy understanding. Reference symbols c, d, and e indicate transverse slit patterns, and c', d', and e' schematically indicate slit patterns obtained by transversely stretching the slit patterns c, d, and e. Although the real slit patterns are transversely much longer than the slit patterns c', d', and e' in practice, they are simplified for the sake of easy understanding.

Figures 13A, 13B:
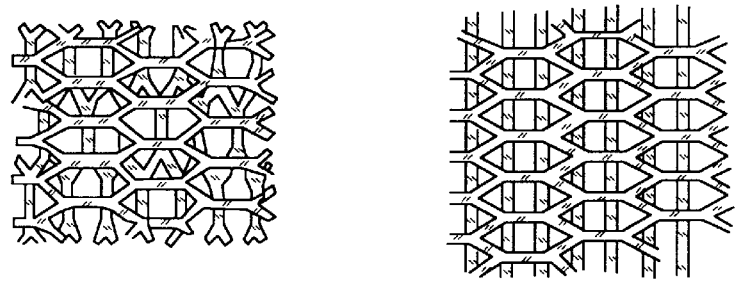
FIGS. 13A and 13B show the concepts of the webs of web-crossed laminates.

FIGS. 13A and 13B show examples of the web-crossed laminates of this invention. The web-crossed laminate shown in FIG. 13A can be manufactured in accordance with the method of FIG. 10 or 11.

In FIG. 13B, tapes manufactured in accordance with a separate method are employed in the longitudinal direction, and are combined with a transversely stretched web of this invention. In this invention, the transverse web has a high transverse stretch ratio even if its raw film has a small width, so that a very wide transversely stretched web can be formed. Thus, the arrangement of FIG. 13B is particularly suitable for manufacturing a large-width web-crossed laminated nonwoven in accordance with this invention.

In this case, although various types of multi-yarns and monofilaments can be employed as the longitudinal tapes, it is particularly preferable to employ high-strength yarns of this invention. When longitudinal tapes are employed, a longitudinal-transverse-longitudinal structure can be formed.

As the film for the manufacture of the meshy web of this invention, one manufactured by the inflation film forming apparatus shown in FIG. 2, by a T-die shown in FIGS. 4A and 4B that has a three-layer die, by a T-die shown in FIG. 5) that performs water-cooling film formation, or by a T-die shown in FIG. 6 that performs chill roll cooling film formation can be employed.

In the inflation film forming apparatus shown in FIG. 2, longitudinal pre-orientation can be achieved with a longitudinal draft, and transverse pre-orientation can be achieved with a blow-up ratio. When effecting longitudinal pre-orientation, the blow-up ratio is preferably small, and usually it is more preferably 2 or less. When effecting transverse pre-orientation, the longitudinal draft ratio is preferably low, and usually it is more preferably 3 or less.

Table 2 shows the physical properties of the longitudinally stretched web and the transversely stretched web of the ultra-high molecular weight polyolefin which is film-formed and stretched in accordance with Examples of this invention, and the physical properties of the transversely stretched web of the ultra-high molecular weight polyolefin having an ordinary molecular weight, which is film-formed and stretched as comparative Examples.

TABLE 2

| | UHP | TEM Type | Wt % | Film forming Apparatus | Film Thickness μm | Pre-stretching Appartus | Stretching direction | Temp. | Ratio | Main Stretching direction | Temp. | Ratio | Tensile Strength/ Elongation g/d | % |
|---|---|---|---|---|---|---|---|---|---|---|---|---|---|---|
| Example 5 | a | | 0 | FIG. 8 | 320 | FIG. 8 | Transverse | 150° C. | 4 | Longitudinal | 150° C. | 39 | 21.8 | 2 |
| Example 6 | a | | 0 | FIG. 8. | 180 | | None | | | Longitudinal | 150° C. | 8 | 11.7 | 7 |
| Example 7 | a | p | 15 | FIG. 8 | 300 | FIG. 8 | Transverse | 140° C. | 4 | Longitudinal | 150° C. | 45 | 18.0 | 3 |
| Example 8 | a | q | 20 | FIG. 2 | 280 | FIG. 8 | Longitudinal | Draft ratio | 5 | Transverse | 150° C. | 37 | 14.2 | 4 |
| Example 9 | b | x | 15 | FIG. 4 | 150 | FIG. 9 | Longitudinal | 98° C. | 2.5 | Transverse | 158° C. | 17 | 15.1 | 4 |
| Comparative Example 3 | c | | 0 | FIG. 2 | 300 | FIG. 1 | Longitudinal | Draft ratio | 5 | Transverse | 135° C. | 9 | 6.2 | 7 |

The items in Table 2 such as UHP, TFM, film forming apparatus, stretching apparatus, and the like of Table 2 correspond to those of Table 1. The measuring conditions for the tensile strength and tensile elongation are the same as those in Table 1.

Example 5 is a case wherein an ultra-high molecular weight polyethylene is formed into a film and the formed film is stretched by the film forming apparatus shown in FIGS. 8A and 8B. By following the same procedures as in Example 1 except for using the film forming apparatus shown in FIGS. 8A and 8B, a transversely stretched film 9 which is stretched 4 times transversely was obtained. After the transversely stretched film 9 was cooled by the cooling roll 10, it was subjected to slitting with hot-blade longitudinal slitters 14, thus forming a web 18 having a number of longitudinal zigzag intermittent slits as indicated by reference symbol a in FIG. 12. In this case, a slit length s was 10 mm, a slit-to-slit distance m was 0.5 mm, and a slit gap p was 2 mm. Although not shown, in the longitudinal stretching step, the film was stretched in three stages with hot air of 150° C. in a free space, and a meshy web having a tensile strength of 21.8 g/d and a tensile elongation of 2% was obtained at a stretch ratio of 31.

In Example 6, a film was formed by using an ultra-high molecular weight polyethylene resin identical to that used in Example 5 in accordance with the same film forming method of FIGS. 8A and 8B. Note that transverse pre-stretching (pre-orientation) was not performed, and the film was directly guided to the cooling roll, and thereafter subjected to longitudinal slitting and longitudinal stretching in the same manner as in Example 5. Although the obtained film had a lower stretch ratio and strength than those of Example 5, it formed a high-strength meshy stretched web having a tensile strength of 10 g/d or more as it was made of the ultra-high molecular weight polyethylene.

In Example 7, 15 wt % of paraffin wax powder having a melting point of 55° C. were mixed as a resin to an ultra-high molecular weight polyethylene powder identical to that of Example 5, and the resultant mixture was supplied through the hopper 20. The film forming method, the transverse stretching method, and the longitudinal stretched method were the same as those of Example 5. However, as the film forming temperature, the stretching temperature, the tensile strength, the tensile elongation, and the like, conditions shown in Table 2 were set.

During the film forming process, the transverse stretching process, and the longitudinal stretching process, the wax was removed as it gradually bled from the ultra-high molecular weight polyethylene phase.

Example 8 shows a case of inflation film formation in accordance with the film forming method of FIG. 2 to have high-density polyethylene as an outer layer. The blow-up ratio (BUR) was 1.1, and the longitudinal draft ratio was 5. In the film forming method shown in FIG. 2, the temperature of the cooling water 27 was 55° C.

Transverse slits of the zigzag intermittent pattern identical to that of Example 5 were formed in the film other than both the side edges thereof with rotating hot blades. This transversely slitted web was transversely stretched 37 times in hot air of 150° C. by using the hot-air transversely splitting units 7a and 7b shown in FIGS. 8A and 8B three times repeatedly. The transverse strength of this transverse web was 14.2 g/d.

Example 9 shows a case wherein a three-layer film was formed, by using the three-layer co-extrusion T-die shown in FIGS. 4A and 4B as the T-die 51 of the apparatus shown in FIG. 5, to have a core made of ultra-high molecular weight polypropylene b and two surface layers made of modified polypropylene. In this case, the water temperature of the water 54 was room temperature (22° C.). The resultant three-layer film was longitudinally stretched 2.5 times at a stretching temperature of 98° C. with the longitudinally stretching apparatus shown in FIG. 9. Thereafter, slits having the same pattern as in Example 5 were formed transversely in this film.

The obtained web was transversely stretched 6 times in hot water of 98° C. with the transverse stretching apparatus shown in FIG. 7 and are then stretched 2.8 times with stretching apparatus shown in FIGS. 8A and 8B to effect stretching by a total of 16.8 times, thereby obtaining a transversely stretched web having a tensile strength of 15.1 g/d.

In this manner, according to this invention, a stretched web of ultra-high molecular weight polyolefin having a tensile strength of 10 g/d or more, preferably 15 g/d or more, and more preferably 18 g/d or more can be obtained.

Comparative Example 3 is identical to Example 5 except that ultra-high molecular weight polyethylene c having a molecular weight of 280,000 was employed as the raw material. With the ultra-high molecular weight polyethylene c having a low molecular weight, the stretch ratio and the tensile strength after stretching were low.

EXAMPLES 10 AND 11 AND COMPARATIVE EXAMPLE 4

In Example 10, a web as in Example 5 was employed as each of the longitudinal and transverse webs. In accordance with the method of FIG. 10 by using the web laminator, both the longitudinal and transverse webs were spread 2 times widthwise and were laminated to cross each other and adhered to each other with a modified polyolefin-based emulsion adhesive (tradename: Chemiparl A100, manufactured by Mitsui Petrochemical Industries, Ltd.) at 140° C.

After web-cross laminating, the web-crossed laminate (or web-crossed laminated nonwoven) had a strength of 8.7 g/d in the longitudinal direction and 8.1 g/d in the transverse direction, and a tensile elongation of 3% in both the directions.

In Example 11, webs were laminated to cross each other in accordance with the method shown in FIG. 11. The web of Example 8 was employed as the transverse web. As the longitudinal web, polyethylene tapes (each having a width of 2.5 mm, a strength of 18.1 g/d, and an elongation of 3%) each having an HDPE surface and a core of ultra-high molecular weight polyethylene were aligned longitudinally at a 5-mm pitch.

After web-cross laminating, the laminate had a strength of 8.2 g/d in the longitudinal direction and 7.4 g/d in the transverse direction, and a tensile elongation of 3% in both the directions.

In this manner, the web-crossed laminate made of ultra-high molecular weight polyethylene mesh stretched web components obtained in accordance with the process for the production of the web-crossed laminate had a strength of 3 g/d or more, preferably 5 g/d or more, and more preferably 7 g/d or more in the stretching-direction.

As the web-crossed laminates have variety of weights and sectional shapes, to express the strength of the web-crossed laminates, g/d (gram/denier) that can be expressed as the strength in weight unit was employed.

Comparative Example 4 shows a commercially available split-fiber nonwoven fabric (tradename: Nisseki Warifu HS) mainly made of high-density polyethylene having an ordinary molecular weight. This nonwoven fabric had a longitudinal strength of 1.6 g/d, a transverse strength of 1.5 g/d, and elongations of 23% and 27% respectively in longitudinal and transverse directions.

(Effect of the Invention)

According to the process for the production of high-strength yarns of this invention, when an ultra-high molecular weight polyolefin film is preliminarily stretched transversely, slitted longitudinally, and thereafter stretched longitudinally, high-ratio longitudinal stretching can be realized, thus realizing high-strength, high-modulus stretched tapes and stretched split yarns.

The stretched tapes of this invention are directly formed into a fabric, a bi-axial or tri-axial web-crossed laminated nonwoven, a unidirectional prepreg, and the like, to be employed as sheets for use in building or civil engineering, e.g., a ballistic protection or a explosion protection; FRTP; FRP; and as various types of reinforcing materials to reinforce a radar dome or concrete structure; and the like.

The stretched tape of this invention is formed into split fibers to be used in various types of ropes, the fabrics described above, and the like.

Since the web-crossed laminate using high-strength high-modulus web-crossed laminated meshy webs made of the ultra-high molecular weight polyolefin of this invention has a high strength and a high modulus, it can be used in applications that cannot use conventional web-crossed laminated meshy webs (split-fiber web-crossed laminated nonwoven). For example, the web-crossed laminate of this invention can be employed in the field that requires a high strength and a high modulus, as in civil engineering and building, as the reinforcing materials, e.g., FRP, FRTP, and the like, the reinforcing materials for concrete or mortar, and the like.

The ultra-high molecular weight polyolefin web-crossed laminate not only has a high strength but also has various characteristics as follows, and is suitably used in applications matching its characteristics.

As the ultra-high molecular weight polyolefin web-crossed laminate has a high cut resistance against cutting tools, it can be employed as a cut protection fabric.

Since the ultra-high molecular weight polyolefin web-crossed laminate is withstand against fragments at an explosion, it (an be used as an explosion protection and a sheet used in building and civil engineering.

The ultra-high molecular weight polyolefin web-crossed laminate can also be used for a reinforcing material of a radar dome or the like because of its electric characteristics.

According to the process for the production of this invention, the processing characteristics of an ultra-high molecular weight polyolefin having poor film forming properties and stretchability are improved.

Regarding the film forming properties since the ultra-high molecular weight polyolefin is mixedly extruded or co-extruded with the thermoplastic low molecular weight material, an ultra-high molecular weight polyolefin having a higher molecular weight than in the conventional method can be employed, thus solving the mechanical problems arising from a high viscosity and a high shear stress. The thus produced film is free from the problem of melt fracture and the like to enable uniform film formation, thereby increasing the production speed. As the ultra-high molecular weight polyolefin having a higher molecular weight than in the conventional method can be employed, the resultant yarns and webs after stretching can have a high strength and a high modulus. With a low molecular weight polymer, high-ratio stretching cannot be performed, and a high strength is not likely obtained. The high molecular weight is effective in improving the various properties, e.g., cut protection properties, creep resistance, and the like.

To add a thermoplastic low molecular weight material also helps in further improving the surface physical properties of the product yarn or web. More specifically, the adhesion properties, coloring, dyeability, weathering resistance, antislip properties, and the like can be improved. When large amounts of antioxidant and heat stabilizer are added to this thermoplastic low molecular weight material, extrusion forming is enabled without degrading the nature of the ultra-high molecular weight polyolefin.

While a web-crossed laminate is often used as a large-width laminate, it is difficult to form a large-width film with ultra-high molecular weight polyolefin, and usually it is difficult to manufacture a large-width web-crossed laminate. When, however, the method of this invention is employed, the longitudinal web is subjected to transverse pre-stretching to increase its width, and the transverse web is subjected to transverse stretching to increase its width. Accordingly, a large-width web-crossed laminate can be formed by laminating these longitudinal and transverse webs to cross each other.

A film formed by melt extrusion or dissolution has large entanglement among its molecules and is difficult to be stretched at a high ratio. However, when this film is subjected to pre-orientation in a direction perpendicular to the final stretching direction, the entanglement is unraveled, a high stretch ratio is enabled, and a high strength and a high modulus are enabled. As an ultra-high molecular weight polyolefin has a poor stretchability, it is difficult to form a large-width stretched film with it. When meshy slits are formed in the film in the stretching direction prior to main stretching, the film becomes free from the problem of aspect ratio.

What is claimed is:

1. A process for producing high-strength yarns comprising the steps of:

melt forming an ultra-high molecular weight polyolefin having a viscosity average molecular weight of at least 500,000 into a film, transversely stretching the film while holding side edges of the film, longitudinally slitting the stretched film into tapes and then longitudinally stretching the thus obtained tapes thereby to produce the high-strength yarns.

2. A process as claimed in claim 1 wherein a molten film obtained by said melt forming is cooled to obtain a solidified film, and the cooled and solidified film is subjected to said transverse stretching.

3. A process according to claim 1, wherein in forming the ultra-high molecular weight polyolefin into the film, a thermoplastic low molecular weight material having a viscosity average molecular weight of up to 500,000 is co-extruded from a die onto a surface or surfaces of the film, thereby forming a two-layer or three-layer extruded film.

4. A process according to claim 1, wherein in forming the ultra-high molecular weight polyolefin into the film, a thermoplastic low molecular weight material having a viscosity average molecular weight of up to 500,000 is mixed with the polyolefin, and the mixture is extruded from a die, thereby forming a film.

5. A process as claimed in claim 1 wherein said transverse stretching of the film is conducted while the film is molten.

6. A process according to claim 2, wherein the cooled and solidified film is made by cooling the molten film with water.

7. A process as claimed in claim 1 wherein said transverse stretching of the film is conducted to obtain a transverse stretch ratio of 1.5 to 8 times.

8. A process as claimed in claim 5 wherein said transverse stretching of the film is conducted to obtain a transverse stretch ratio of 1.5 to 8 times.

9. A process as claimed in claim 8 wherein said stretch ratio is 2 to 5 times.

10. A process as claimed in claim 1 wherein said longitudinal stretching is conducted to obtain a longitudinal stretch ratio of at least 10.

11. A process as claimed in claim 10 wherein said longitudinal stretch ratio is at least about 50.

12. A process as claimed in claim 1 wherein said longitudinal stretching is conducted to obtain a longitudinal stretch ratio of at least 30.

13. A process as claimed in claim 1 wherein said polyolefin is a polyethylene or polypropylene.

14. A process as claimed in claim 1 wherein said molecular weight is at least 1,000,000.

15. A process as claimed in claim 3 wherein said molecular weight of said thermoplastic low molecular weight material is up to 100,000.

16. A process as claimed in claim 4 wherein said molecular weight of said thermoplastic low molecular weight material is up to 100,000.

17. A process as claimed in claim 3 wherein said thermoplastic low molecular weight material is polyethylene or polypropylene.

18. A process as claimed in claim 4 wherein said thermoplastic low molecular weight material is polyethylene or polypropylene.

* * * * *